United States Patent
Katz et al.

(10) Patent No.: US 7,072,692 B1
(45) Date of Patent: Jul. 4, 2006

(54) METHOD OF DIRECTIONAL RADIO COMMUNICATION

(75) Inventors: Marcos Katz, Oulu (FI); Juha T Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/018,161

(22) PCT Filed: Sep. 14, 1999

(86) PCT No.: PCT/EP99/06778

§ 371 (c)(1),
(2), (4) Date: May 21, 2002

(87) PCT Pub. No.: WO00/67509

PCT Pub. Date: Nov. 9, 2000

(30) Foreign Application Priority Data

May 1, 1999 (EP) .................... PCT/EP99/03093

(51) Int. Cl.
*H04Q 7/20* (2006.01)

(52) U.S. Cl. ............ 455/562.1; 455/63.4; 455/532.1; 455/442; 455/443; 455/444; 455/449

(58) Field of Classification Search ........... 455/561, 455/562, 277.2, 440, 524, 550, 560, 269, 455/422, 13.3, 63.4; 342/174, 368, 360
See application file for complete search history.

(56) References Cited

U.S. PATENT DOCUMENTS

| | | | | |
|---|---|---|---|---|
| 6,124,824 A | * | 9/2000 | Xu et al. ................ | 342/174 |
| 6,151,513 A | * | 11/2000 | Petry et al. ............ | 455/562.1 |
| 6,198,925 B1 | * | 3/2001 | Lee ....................... | 455/434 |
| 6,345,188 B1 | * | 2/2002 | Keskitalo et al. ....... | 455/561 |
| 2001/0016504 A1 | * | 8/2001 | Dam et al. .............. | 455/562 |

FOREIGN PATENT DOCUMENTS

| EP | 0 777 400 A2 | | 6/1997 |
|---|---|---|---|
| EP | 841826 A2 | * | 5/1998 |
| WO | WO 96/37969 | | 11/1996 |
| WO | WO 98/13952 | | 4/1998 |
| WO | WO 98/25362 | | 6/1998 |
| WO | WO 99/60809 | | 11/1999 |

* cited by examiner

*Primary Examiner*—Joseph Feild
*Assistant Examiner*—Julio Perez
(74) *Attorney, Agent, or Firm*—Harrington & Smith,LLP

(57) ABSTRACT

A method of directional radio communication between a first station and a second station, the method comprising the steps of defining at the first station a plurality of beam directions available for transmitting successive signals from the first station, selecting at said first station at least one of said directions for transmission of a signal from said first station to said second station, wherein the selection of the at least one direction for transmission is such that successive signals or groups of signals are transmitted in substantially different directions and such that on average each beam direction available to said first station is used substantially equally.

34 Claims, 5 Drawing Sheets

METHOD OF DIRECTIONAL RADIO COMMUNICATION

CROSS-REFERENCE TO RELATED APPLICATION

The present application is a U.S. national stage entry of International Application No. PCT/EP99/06788, filed Sep. 14, 1999, which claims priority of International Application No. PCT/EP99/03903, filed May 1, 1999.

This invention relates to a method of directional radio communication and in particular, but not exclusively, to a method for use in cellular communication networks using space division multiple access.

Cellular communication networks based on space division multiple access and the advantages associated therewith are well known. The area covered by a cellular network is divided into a plurality of cell or cell sectors. Each cell is served by a base station which transmits signals to and receives signals from mobile stations located in the cell or cell sector associated with the respective base station. In a space division multiple access system, the base transceiver station will not transmit signals intended for a given mobile station throughout the cell or cell sector but will only transmit the signal in a beam direction from which a signal from the mobile station is received.

As the beam which is transmitted by the base transceiver station may only be transmitted in a particular direction and accordingly may be relatively narrow, the transmission power is concentrated into that narrow beam. The base station is also able to distinguish the signals received from different directions. This results in a better signal to noise ratio with both the signals transmitted from the base transceiver station and the signals received by the base transceiver station. The interference caused by the signal transmitted by the base station to the mobile station to other mobile stations in the same cell or adjacent cells is also reduced. This increases the capacity of the system and/or increases the quality of communication.

SDMA systems can be implemented in analogue and digital cellular networks and may be incorporated in the various existing standards such as GSM, DCS 1800, TACS, AMPS and NMT. SDMA systems can also be used in conjunction with other existing multiple access techniques based, for example, on time division multiple access (TDMA) code division multiple access (CDMA), such as that described by the US IS-95 CDMA standard and the proposed third generation standard, and frequency division multiple access (FDMA) techniques.

Signals transmitted from a mobile station to a base transceiver station are known as "uplink" signals and signals transmitted from a base transceiver station to a mobile station are known as "downlink" signals. The uplink communication stream received by the base transceiver station from the mobile station comprises a series of communication bursts received in successive time slots. Each received burst of the uplink communication stream includes a reference signal and a data signal.

Likewise, the downlink communication stream transmitted from the base transceiver station to the mobile station comprises a series of communication bursts transmitted in successive time slots. Each respective burst of the downlink communication stream includes a reference signal and a data signal. The reference signals of the uplink and downlink communication streams are, in this example, referred to as pilot signals which are the reference signals in CDMA systems.

Signals transmitted from base stations should be transmitted with enough power to guarantee that the signal received by a particular target mobile station has an acceptable quality while at the same time trying to minimise the effect of that signal on other active mobile stations operating in the same or other sectors.

Conventional adaptive base transceiver stations process each communication burst received in the uplink direction to determine transmission parameters for the corresponding burst in the downlink direction. The direction of transmission to be used in the downlink communication for a given time slot is determined based on direction of arrival information estimated from the uplink communication of the corresponding time slot, the uplink and downlink signals being at different frequencies.

Circuitry within the base transceiver station determines, for each receive time slot, an angular power profile of the uplink signal impinging on the base station antenna array from the mobile station and indicates transmission parameters to be used in each transmission time slot. In practice, the determined angular power profile is supplied to signal processing and decision circuitry which executes a beam selection algorithm to determine the downlink transmission parameters. Thus, the or each direction of transmission for a given communication burst, including for the pilot and data signals within that burst, is determined from estimations of pilot symbols received from the mobile station during the corresponding uplink communication burst. The selected transmission parameters are kept fixed for at least the duration of that burst, i.e. for the entire transmission time slot.

As is known, a signal from a mobile station will generally follow several paths to the BTS. Those plurality of paths are generally referred to as multipaths. A given signal which is transmitted by the mobile station may then be received by the base transceiver station from more than one direction due to these multipath effects.

In general, the use of beams in more than one downlink transmission direction leads to a better quality of signal received at the mobile station. One reason for this is that using a plurality of beams increases the angular diversity and consequently decreases the signal outage probability. However, a greater number of beams leads to the generation of more interference. In certain circumstances, the nature of the generated interference means that even limiting the transmission to two beam directions does not relieve problems between co-channel users.

The performance of downlink is measured not only in terms of the quality of signal at the receiving mobile station but also by taking into consideration the use of radio resources and interference to other users resulting from the requirement to achieve that level of quality. The base station aims to achieve at the mobile station a signal quality which is sufficient to produce an acceptable and/or pre-determined quality of service with minimum expenditure of radio resources. Spectral efficiency has a direct impact on system capacity and link performance. Improving link performance will generally require an increase in transmission power or an increased use of radio resources, both of which tend to increase the level of generated interference.

This problem worsens in environments characterized by larger angular spreads (e.g., micro- and pico-cells) and also when the angular resolution of base station is increased (e.g., the number of antenna elements is large). The radio channels of indoor environments are typically characterised by small delay and Doppler spreads and large angular spreads. This behaviour results from the rather short base to mobile station distances (the cell is small), the relatively low mobility of the users and the physical environment, and the fact that comparable distances exist between surrounding environment and transmitting and receiving units.

A particular aspect of indoor environments is the simultaneous presence of different kinds of traffic, involving for instance multi-rate services. A common operating scenario will include, for instance, a few high-bit rate users, the rest being basic (speech) users who all operate at the same time. An effective transmission strategy for a base station using adaptive antennae might be to select the most convenient downlink directions of transmission based on estimated uplink directions with high associated power.

In a low mobility environment (e.g. an indoor cell) the physical radio environment will tend to remain unchanged for a considerable amount of time and thus the direction(s) of transmission selected for each mobile station will be kept the same for relatively long periods. In multi-rate environments, this approach can generate undesirably high levels of spatially coloured interference. In other words, the background interference varies across the cell. For example, a base station serving a fixed or slowly moving high bit rate user operating in a pico-cell (i.e. a small cell) will select a few (e.g. two) directions of transmission based on the best received signal paths. In addition, to provide signals to the target high bit rate mobile station, the base station also produces high powered interference in the selected directions. Low bit rate users operating within the corresponding illuminated area will clearly be affected by this cross-correlation type of interference. The degrading effect of the interference is intensified by the fact that interfering signal tends to stay unchanged in the spatial (and delay) domain and consequently no averaging can be exploited by the receiver.

Thus in indoor environments, and in other environments where the angular spread is large and/or the user mobility is low, a conventional base station using adaptive antennas will tend to generate highly coloured interference when transmitting in the downlink direction. The spatial directions employed by high bit rate users tend to contain signals at high levels of transmitted power and thus affect lower bit rate co-channel users.

Embodiments of the present invention seek to provide an improved method for directional radio communication.

According to an aspect of the present invention there is provided a method of directional radio communication between a first station and a second station, the method comprising the steps of determining at the first station a set of one or more directions which are feasible for use in transmitting a signal from said first station to said second station using a signal received from said second station, selecting at said first station at least one of said directions for transmission of a signal from said first station to said second station, wherein the selection of the at least one direction for transmission is such that successive signals or groups of signals are transmitted in substantially different directions and such that on average each beam direction available to said first station is used a substantially equally number of times.

In one embodiment one beam direction is selected for the transmission of a signal from said first station to said second station. However, more than one beam directions can be selected for the transmission of a signal from the first station to the second station. Preferably, two beam directions are selected for the transmission of a signal from said first station to said second station.

In certain embodiments the at least one direction for transmission is selected for a given time slot. However, the at least one direction for transmission can be selected for a given signal packet. Alternatively, the at least one direction for transmission is varied within a signal burst such that the at least one direction for transmission is selected for a component part of a signal packet or a time slot.

In some embodiments, transmission direction can be selected by a random selection step and a subsequent verification step. In other embodiments the at least one direction for transmission is selected from the set of feasible directions according to predetermined rules.

According to another aspect of the present invention there is provided apparatus for directional radio communication between a first station and a second station, the apparatus comprising means for determining a set of one or more directions which are feasible for use in transmitting a signal from said first station to said second station using a signal received from said second station and means for selecting at said first station at least one of said directions for transmission of a signal from said first station to said second station, wherein the selection of the at least one direction for transmission is controlled such that successive signals or groups of signals are transmitted in substantially different directions and such that on average each beam direction available to said first station is used a substantially equally number of times.

Preferred methods and apparatus improve link quality because they lead to improvements in spatial correlations between the uplink and downlink channels. Preferred methods also provide fast angular diversity and the efficient whitening of the generated co-channel interference. Methods embodying the invention have particular advantages in radio environments characterised by large angular spreads and/or where base transceiver stations have relatively high angular resolutions.

A number of transmission direction selection schemes may be employed in various embodiments.

For a better understanding of the present invention and as to how the same may be carried into effect, reference will be made by way of example only, to the accompanying drawings in which.

Figure 1:
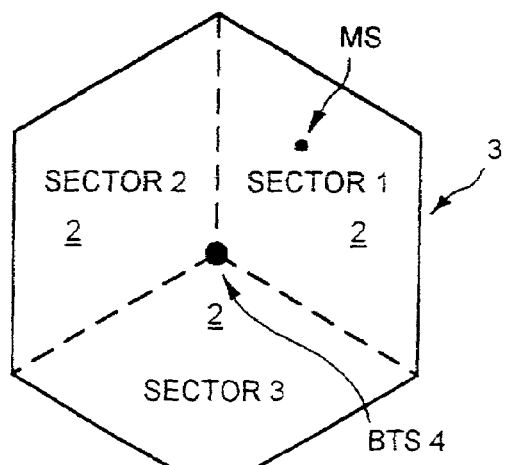
FIG. 1 is a schematic view of a base transceiver station and its associated cell sectors.

Reference will first be made to FIG. 1 which shows three cell sectors 2 of a cellular mobile telephone network. The three cell sectors 2 are served by respective base transceiver stations (BTS) 4. Three separate base transceiver stations 4 are provided at the same location. Each ETS 4 has a transceiver which transmits and receives signals to and from a respective one of the three cell sectors 2. Thus, one dedicated base transceiver station is provided for each cell sector 2. Each BTS 4 is thus able to communicate with mobile stations (MS) such as mobile telephones which are located in respective cell sectors 2.

Data is transmitted between the base station 4 and the mobile station in successive communication bursts. Each communication burst includes a reference signal which is a known sequence of data. The purpose of the reference signal is generally to allow information which assists operation of the system to be obtained by the receiving station. This type of information includes, for example, direction of arrival information, signal strength information and delay information. In current GSM systems the reference signal is referred to as the training sequence, whereas in CDMA systems the reference signal corresponds to the pilot signal. Preferred embodiments will be described in the context of a code division multiple access system which uses an antenna array at the base station. Each communication burst is transmitted in a given communication channel defined by the selected direction and the applied spreading code.

Figure 2:
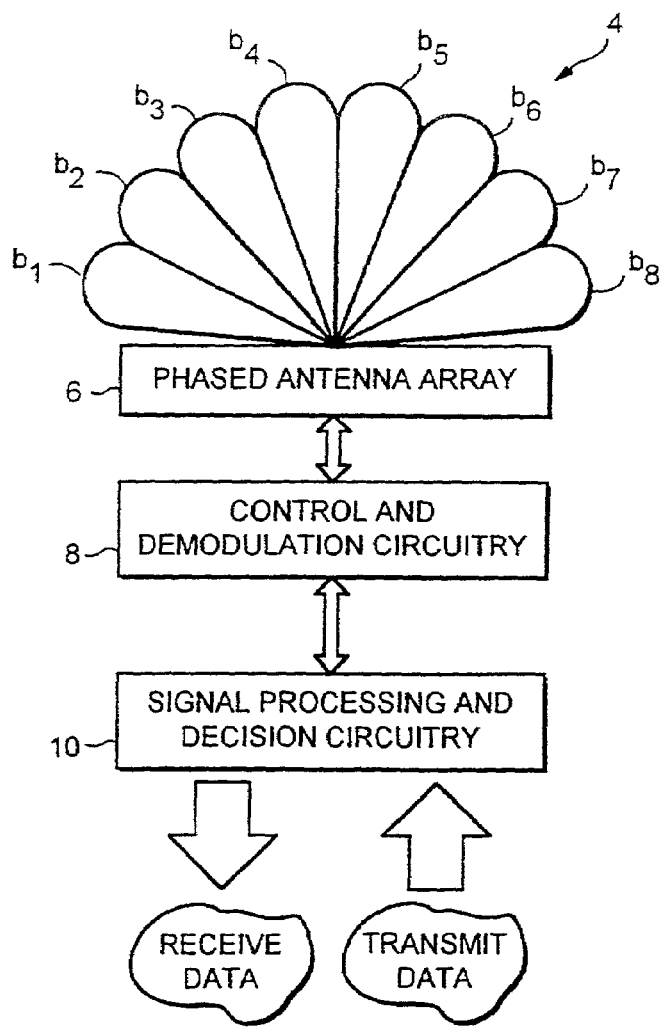
FIG. 2 is a schematic view of the base transceiver station of FIG. 1.

FIG. 2 shows a schematic view of a base transceiver station 4 suitable for code/space division multiple access systems. The base station 4 only serves one of the three cell sectors 2 shown in FIG. 1. Another two base stations 4 are provided to serve the other two cell sectors 2. It should be appreciated that the various blocks illustrated in FIG. 2 do not necessarily correspond to separate elements of an actual base transceiver station for performing the method of the present invention. The various blocks illustrated in FIG. 2 correspond to various functions carried out by the base transceiver station.

The base transceiver station 4 has an antenna array 6. In this example, the antenna array 6 has eight antenna elements. The elements are arranged to have a spacing of about a half wavelength between each antenna element and are arranged in a horizontal row in a straight line. Each antenna element is arranged to transmit and receive signals and can have any suitable construction. Each antenna element may be a dipole antenna, a patch antenna or any other suitable antenna. The eight antenna elements together define a phased antenna array 6.

Each antenna element of the phased array antenna 6 is supplied with the same signal to be transmitted to a mobile station MS. However, the phases of the signals supplied to the respective antenna elements are shifted with respect to each other. The differences in the phase relationship between the signals supplied to the respective antenna elements gives rise to a directional radiation pattern. The antenna array 6 can be controlled to provide a beam in one or more of the eight directions $b_1$–$b_8$ illustrated. For example, the antenna array 6 could be controlled to transmit a signal to a MS only in the direction of beam $b_5$ or only in the direction of beam $b_6$ or in more than one beam direction at the same time. Further, a signal may be transmitted in the two directions defined by beam $b_5$ and beam $b_6$ or in the three directions defined by $b_1$, $b_2$ and $b_4$.

The control and demodulation circuitry 8 includes beam forming circuitry such as Butler matrix circuitry, amplifier stages, analogue-to-digital converter arrays and digital to analogue converter arrays. In certain embodiments, digital beam forming means are used instead of analogue beam forming means and these are implemented in the signal processing and decision block 10. In the receive direction, the beam forming circuitry detects the phase difference between each of the signals received by the respective antenna elements and uses this information to determine the or each beam direction from which the signal has been received. Received signals are typically then passed through the amplifier stages to demodulation circuitry where the carrier frequency component is removed. The received analogue signal is converted to a digital signal and is output to the signal processing and decision circuitry 10. In the transmit direction, the relative phase of the signal supplied to each antenna element and thus also the desired beam direction is controlled by the beam forming circuitry. Before being supplied to the antenna elements digital data from the signal processing circuitry are converted to analogue signals and modulated onto the carrier frequency.

The signal processing and decision circuitry 10 despreads the received signal. The signal processing and decision circuitry determines the channel impulse response for the received signals from which parameters used to define a channel for transmission of subsequent signals can be determined. The signal processing and decision circuitry 10 also carries out cross-correlation and analysis. Cross-correlation is used to generate taps which are representative of the channel impulse response for that correlation and compares received signals and stored information. A channel impulse response is generated for each channel corresponding to a given communication burst received in each of the eight antenna directions $b_1$–$b_8$.

The analysis carried out within the signal processing and decision circuitry 10 is for determining and storing the maximum energy calculated from the channel impulse response. The signal processing and decision circuitry 10 also analyses the channel impulse responses to ascertain the minimum delay with which a given signal is received. The channel with the minimum delay may represent the line of sight path between a mobile station and its base transceiver station.

Decision circuitry of the signal processing and decision circuitry 10 compares the determined parameters for each channel to determine transmission parameters for signals to be subsequently transmitted. The decision circuitry use a beam selection algorithm to select transmission parameters such as beam direction and power level based on the information from the received signals. This selection can use simple methods such as selecting the beam directions having the maximum energy and/or the minimum delay in the received signals. Alternatively, more complicated methods of selection may be used.

Figure 3:
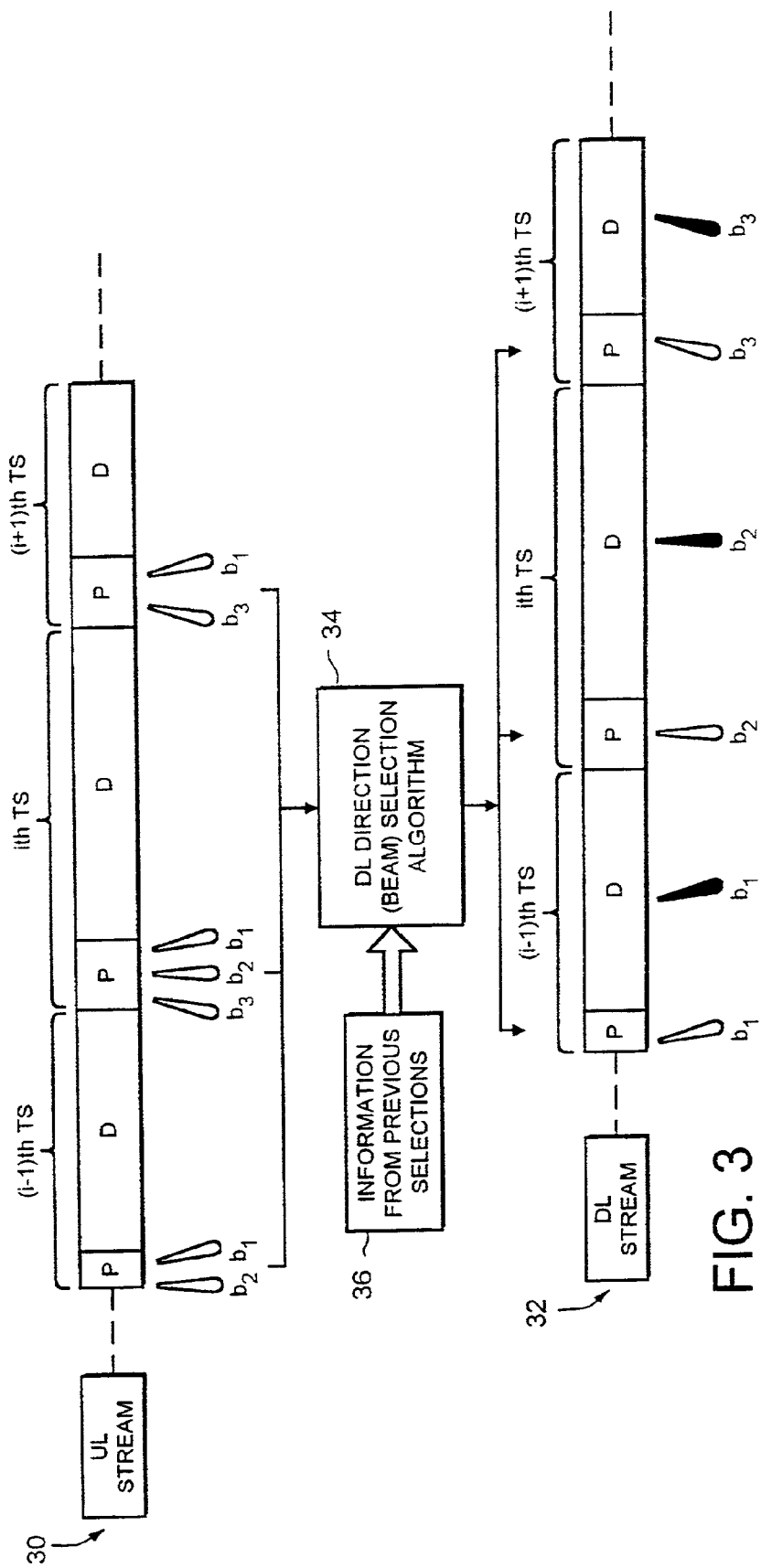
FIG. 3 is a schematic illustration of a first embodiment.

FIG. 3 schematically illustrates a first embodiment. As shown in FIG. 3, the base transceiver station receives an uplink communication stream 30 from a mobile station. The uplink communication stream 30 comprises a series of successive communication bursts in the (i−1)th, ith and (i+1)th receive time slots, respectively. Each communication burst includes a pilot signal P and a data signal D. The pilot signal P includes a known sequence of data and is received in one or more specific directions of arrival. In the example of FIG. 3, the pilot signal of the (i−1)th time slot is received in the directions $b_1$ and $b_2$. The pilot signal of the ith time slot is received in the time slot $b_1$, $b_2$ and $b_3$. The pilot signal of the (i+1)th time slot is received in the directions $b_1$ and $b_3$. The signal processing and decision circuitry 10 of the base transceiver station 4 uses a beam selection algorithm 34 to determine which transmission directions to use for a given downlink communication time slot based on the directions in which the pilot signal P is received in the corresponding uplink communication burst and possibly also taking into account information from previous time slots 36. In other embodiments, beam selection for transmission in the downlink communication slot is based on the directions in which the whole signal burst, i.e. both the pilot and data signals, are received.

For communication in the downlink direction the direction selected for transmission is varied from one communication burst to the next. Thus in this example a different downlink transmission direction is selected for each respective time slot, whenever possible. For example, the signal burst (including the pilot and data signals) of the (i+1)th downlink time slot is transmitted in a different direction to that used in the ith time slot. Similarly, the signal burst of the ith time slot is transmitted in a direction which is different to that used in the (i−1)th time slot. This is schematically illustrated in FIG. 3 for the signal bursts of the downlink stream 32 by the directional antenna beams $b_1$, $b_2$ and $b_3$. In this example, the direction of transmission is changed from one time slot to the next and the pilot signal P and data signal D within a given time slot are transmitted in the same direction. However, this need not necessarily be the case. The number of directions used may vary from time slot to time slot, as will be explained hereinafter.

The total number of selectable beam directions is typically a predetermined number which depends on the number of elements in the antenna array. According to the general scheme of FIG. 3 the base transceiver station 4 estimates an angular power profile upon reception of an uplink communication burst and using this information determines the directions of transmission to be used in the corresponding downlink communication burst. This angular power profile is based on the received pilot signals P and includes direction of arrival information, an example of which is provided in FIG. 4. In principal, any method for assessing the direction of arrival (DOA) could be employed to determine the set of feasible transmission directions. An environment characterised by a large angular spread typically produces a number of different directions which are feasible for use in the downlink transmission direction. The power profile illustrated in FIG. 4 shows estimated signal power (above a given threshold Th) as a function of antenna beam direction measured in azimuthal angle of arrival.

Figure 4:
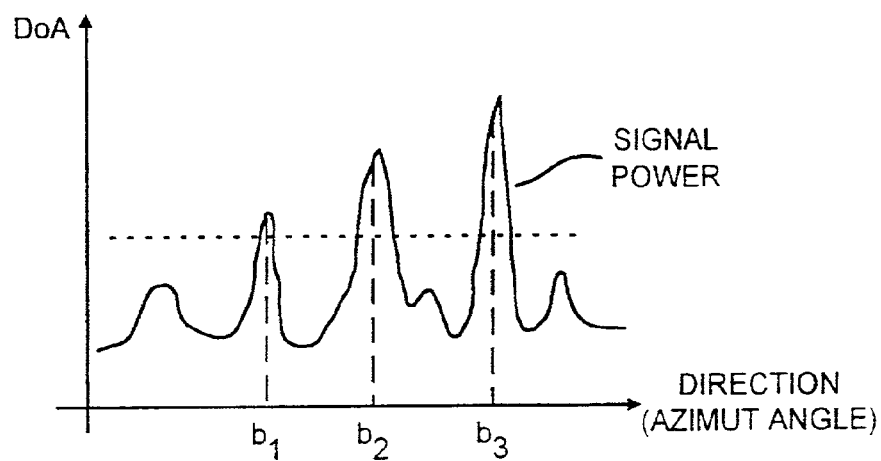
FIG. 4 is an example of direction of arrival data.

According to the angular power profile of FIG. 4 signals of appreciable strength, i.e. above the threshold Th, are received in the antenna beam directions $b_1$, $b_2$ and $b_3$, with the signal of maximum energy being received from direction $b_3$. This angular power profile could therefore correspond to the ith received time slot illustrated in FIG. 3. The predetermined threshold Th is used to ensure that only directions of arrival having appreciable signal strengths are taken into account. Any of the directions from which signals of appreciable strength are received can be regarded as feasible directions for transmission in the downlink direction.

Figure 5:
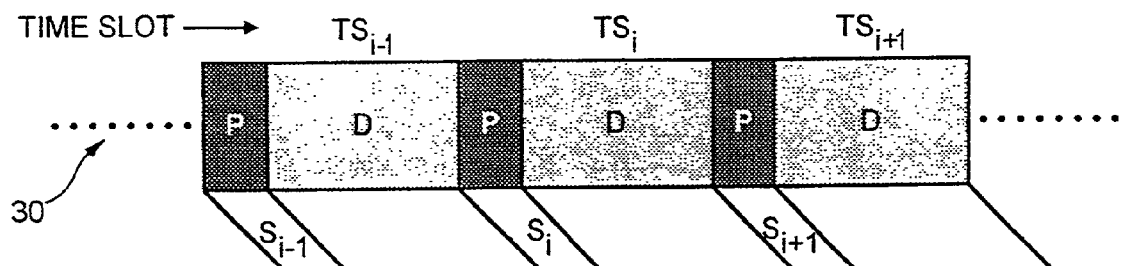
FIG. 5 is a more detailed representation of an uplink communication burst.

Referring now to FIG. 5, a set of feasible transmission directions $S_i$ and the number of feasible directions $n_i$ can be determined from the angular power profile determined from the pilot symbols of the ith received time slot. The number of feasible directions $n_i$ corresponds to the number of directions from which signals are received which have a strength greater than the predetermined threshold Th.

Thus, the set of feasible transmission directions $S_i$, may be represented as $$S_i = \{b_1, b_2, b_3, \ldots b_x, b_{x+1}\} \quad (1)$$

where $b_1 \ldots b_{x+1}$ are each feasible directions for transmission.

The receive communication stream 30 illustrated in FIG. 5 shows three consecutive receive time slots, namely the (i−1)th time slot, the ith time slot, and the (i+1)th time slot. Each time slot comprises pilot symbols P and data D. Three sets of feasible transmission directions $S_{i-1}$, $S_i$ and $S_{i+1}$ are generated in accordance with the angular power profiles determined from the pilot symbols of the (i−1)th, ith and (i+1)th receive time slots, respectively.

In general, $n_i$ will depend upon the type of radio environment and the average value of $n_i$ would be expected to increase with the angular spread of the channel in question. The value of $n_i$ is also dependent upon the spatial resolution of the base station (e.g. the number of separate antennas which make up the antenna array). The rate of change of the elements of the set of feasible transmission directions $S_i$ and its size $n_i$ (i.e. the number of feasible directions) depends directly on the rate of change of the radio environment. In indoor environments, the number of feasible transmission directions determined from a given angular power profile might be say between 2 and 6, and once determined the set of directions can generally be used for relatively long periods of time (e.g. say tens or hundreds of time slots).

The or each transmission direction is selected from the set of feasible transmission directions $S_i$. The set of transmission directions selected from the set of feasible directions $S_i$ will be referred to herein as $T_i$ and the number of directions within that set as $1_i$. Preferred embodiments of the method of directional radio communication select, whenever possible, different beam directions for successive downlink signal transmissions. That is, whenever possible, a given signal burst of the downlink communication stream is transmitted in substantially different direction to that used for the preceding signal burst. The manner of selection used for downlink transmission seeks on average to use all of the available directions an equal number of times. In the embodiment described hereinafter in relation to FIG. 6, a single beam direction is selected for transmission from the feasible directions (i.e. $1_i = 1 \forall_i$). However, in other embodiments multiple directions are selected for transmission from the feasible directions (i.e. $1_i > 1 \forall_i$). For example, in the embodiment described hereinafter with reference to FIG. 7 two beam directions are selected for transmission.

Figure 6:
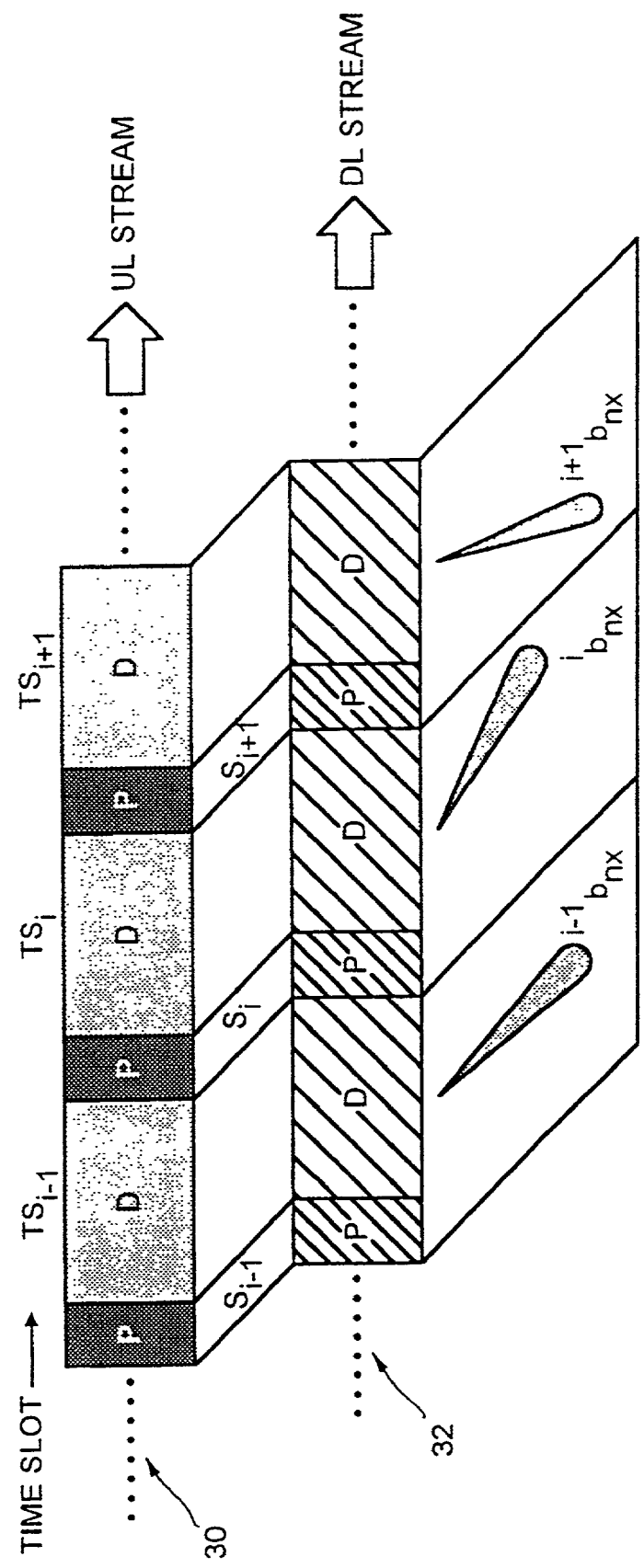
FIG. 6 is a representation of uplink and downlink communication bursts used in the embodiment of FIG. 3.

Referring to FIG. 6, only one beam direction is selected for downlink transmission in each time slot and, whenever possible, the direction selected is different to that selected for transmission in the preceding time slot. For the signal burst received in the (i−1)th time slot the set of feasible directions for transmission in the downlink direction is indicated as $S_{i-1}$. This set is determined from the angular power profile of the pilot symbols P received in the (i−1)th time slot as described hereinbefore. The beam selection algorithm 34 which is provided with information on the transmission direction used in previous time slots then selects a beam direction to use for transmission in the corresponding downlink time slot. In this example, the direction $^{i-1}b_{nx}$ is selected for transmission in the corresponding (i−1)th downlink time slot. It will be apparent that the set of feasible directions for downlink transmission must have contained the direction $b_{nx}$ and it may or may not have contained other feasible transmission directions for the downlink communication.

For the signal burst received in the ith time slot the set of possible directions for transmission in the downlink direction is indicated as $S_i$. This set is determined from the angular power profile of the received pilot symbols of the ith receive time slot. The beam selection algorithm 34 selects a beam direction to use for transmission in the corresponding downlink time slot based on the contents of the set $S_i$ and with the knowledge that $^{i-1}b_{nx}$ was used as the transmission direction in the preceding downlink time slot. In this example, the direction $^ib_{nx}$ is selected for transmission in the corresponding downlink ith time slot. It will be apparent that the set $S_i$ of feasible directions for downlink transmission in the ith time slot contained the direction $b_{nx}$ and may also have contained other feasible transmission directions for the downlink communication. The downlink transmission direction $b_{nx}$ was selected because it was a feasible direction as determined by the angular power profile and was a different direction to that used in the preceding downlink transmission slot. Had the set $S_i$ contained only the direction $^{i-1}b_{nx}$ then it would have been impossible to select a direction different to the downlink transmission direction used in the preceding (i−1)th time slot. This situation is explained in more detail later.

For the signal burst received in the (i+1)th time slot the set of feasible directions for transmission in the downlink direction is indicated as $S_{i+1}$. This set is determined from the angular power profile in the usual manner and is input to the beam selection algorithm 34 which is also provided with the knowledge that the direction $^ib_{nx}$ was used in the preceding ith time slot. In this example, the set $S_{i+1}$ of feasible directions for transmission in the downlink direction contains the direction $^{i+1}b_{nx}$ which was not used in the preceding ith time slot and this direction is selected for downlink transmission in the (i+1)th time slot.

The embodiment described with reference to FIG. 6 can be expressed mathematically by defining the direction of transmission $^ib_{nx}$ for the ith time slot as follows $$^ib_{nx} \in S_i, \text{ and, whenever possible } ^ib_{nx} \neq {}^{i-1}b_{nx} \qquad (2)$$

where $^{i-1}b_{nx}$ and $^ib_{nx}$ are the beam directions selected in the (i−1)th and ith time slots respectively.

It should be appreciated that in certain circumstances a directional hop will not be possible. That is, selection of a transmission direction which is different to that used in the preceding time slot will not be possible. For example, if the set of feasible transmission directions comprises only the direction corresponding to that used in the preceding slot. This exception can be expressed mathematically as $S_i \neq {}^{i-1}b_{nx}$, where $^{i-1}b_{nx}$ is the transmission direction selected in the preceding time slot.

i.e. a beam hop will not be possible when the present set $S_i$ has a unique element which is equal to the previously selected element.

Between them equation (2) and the above exception mean that, whenever possible, two successive downlink signal bursts will be directed towards different angular positions within the cell or cell sector served by the base station.

To maximise the benefit from increased diversity, preferred embodiments seek on average to use all of the available directions of transmission $b_1$–$b_8$ an equal number of times. Predetermined rules can control selections of the downlink transmission direction such that on average the cell or cell sector served by the base station is systematically and evenly illuminated. Preferably, the probability of transmitting in a given downlink transmission direction is constant and equal to 1/m, where m is the total number of beam directions $b_1$–$b_8$ available to the system. In this way, the density of interference is uniformly distributed over the area served by the base station. This is an efficient way of spatially whitening the interference generated. Examples of selection strategies are set out below:

Random Directional Hopping

The downlink transmission direction $^ib_{nx}$ is selected from the set of feasible transmission directions $S_i$ at random. This approach is effective, simple and thus easy to implement. A verification procedure can be used to reduce use of or avoid using altogether the same transmission direction in successive signal bursts (i.e. to avoid the condition $^ib_{nx}={}^{i-1}b_{nx}$). According to one such verification procedure, a new selection is carried out if it is determined that $^ib_{nx}={}^{i-1}b_{nx}$. This second random selection is performed and the beam selected in the second random selection is used whatever the result (i.e. even if $^ib_{nx}={}^{i-1}b_{nx}$ again). Limiting the number of selection and verification steps in this way can simplify implementation considerably. In other circumstances, the number of selection and verification steps may not be limited to one and in principle the number of such steps can be any number up to when $^ib_{nx} \neq {}^{i-1}b_{nx}$.

Predetermined Directional Hopping Patterns

Another example is where the downlink transmission direction $^ib_{nx}$ is selected from the set $S_i$ according, whenever possible, to a predetermined directional hopping pattern designed to ensure that on average all of the available transmission directions are used equally. This category of selection method includes spatial scanning strategies, three examples of which are provided below. In general such strategies seek to gradually scan through the plurality of beam directions available for downlink transmission by selecting from the feasible beam directions in a systematic manner. The area served by the base station is divided into a plurality of directions which are arbitrarily numbered $b_1$ through $b_8$. The scanning process may involve for example, ascending (increasing), descending (decreasing) or ascending then descending through the plurality of feasible beam directions contained in the set Si.

In increasing spatial scanning, the downlink direction of transmission $b_{nx}$ is selected such that $^ib_{nx}$ is substantially adjacent to $^{i-1}b_{nx}$ and of an incrementally higher value. Once the maximum numbered direction has been reached the directional scanning process begins again from the minimum value direction available, and so on. That is, whenever possible, the direction of transmission $b_{nx}$ is selected such that $^ib_{nx} \pm {}^{i-1}b_{nx}$ (where ± indicates that $^ib_{nx}$ is the closest possible beam direction in which $^ib_{nx} > {}^{i-1}b_{nx}$). Such a directional hopping process would thus seek to successively select from the feasible transmission directions by stepping through the feasible directions from the lowest value direction, returning to the lowest value direction to repeat the scan in the same direction once the highest value direction has been reached.

In decreasing spatial scanning, the downlink direction of transmission $^ib_{nx}$ is selected starting at the highest value direction such that $^ib_{nx}$ is substantially adjacent to $^{i-1}b_{nx}$ and of an incrementally lower value. Once the lowest value direction has been reached, the directional scanning process begins again from the maximum value direction available, and so on. That is, when ever possible, $^ib_{nx} \pm {}^{i-1}b_{nx}$ (where ± indicates that $^ib_{nx}$ is the closest possible direction in which $^ib_{nx} < {}^{i-1}b_{nx}$). This directional hopping process thus seeks to successively select from the feasible transmission directions beginning at the highest value direction and stepping through to the lowest value direction, returning to repeat the scan in the same direction once the lowest value direction has been reached.

Increasing-decreasing spatial scanning is a combination of the increasing and decreasing methods, according to which the progressive spatial scanning incrementally shifts between two available extremes defined, at any point in time, by the set of feasible directions. This type of directional hopping process seeks to successively select from the feasible transmission directions beginning say at the lowest value direction and stepping through to the highest value direction before reversing the direction of scanning once the highest value direction has been reached.

In cases where the predetermined directional hopping pattern cannot be followed because the selection of transmission direction according to the pattern is the same as that in the previous downlink signal burst (i.e. $^ib_{nx}={}^{i-1}b_{nx}$), a deviation from the pattern may be allowed. Rules can govern what happens when the predetermined patterns are deviated from. For example, in one embodiment the transmission direction is selected again at random. In another embodiment the violating direction is simply omitted and the process thereafter continues according to normal procedure.

Another example of directional hopping according to a predetermined selection pattern is referred to herein as step hopping. In this example, the downlink transmission direction is selected from the set of feasible directions to be, wherever possible, a direction which differs from the direction selected in the preceding signal burst by a given angular step $\pm \Delta b$. In this way, the selected downlink transmission direction alternates right-to-left and right again (etc) about the line of sight direction. Step hopping is useful, in particular, where fixed terminals operate in indoor cells. In a modified version of step hopping, the downlink transmission direction is selected from the feasible directions to be, wherever possible, a direction which differs from a reference direction by a given angular step $\pm \Delta b$. The reference direction may be checked and updated at intervals.

In both types of step hopping, the angular step $\pm \Delta b$ is preferably optimised to reduce or avoid the effect of accumulated interference towards a given direction. Such patterns can provide that the actual direction selected $^{i}b_{nx}$ alternates from one side of the previously used direction $^{i-1}b_{nx}$ (or the reference direction $^{R}b_{nx}$) to the other while maintaining the angular gap. That is, a given selection can be $^{(i-1)}b_{nx}+\Delta b$ (or $^{R}b_{nx}+\Delta b$) and the subsequent selection can be $^{(i-1)}b_{nx}-\Delta b$ (or $^{R}b_{nx}-\Delta b$), and so on.

The methods described hereinabove seek on average to evenly distribute the generated interference over the area of the cell or cell sector served by the base station.

In certain embodiments a generalisation of equation 2 may be applied, i.e.

$$^{i}b_{nx} \in S_i \text{ and,} \qquad (3)$$
$$\text{whenever possible } ^{i}b_{nx} \neq ^{i-1}b_{nx} \neq ^{i-2}b_{nx}, \cdots \neq ^{i-N}b_{nx}$$

Selection according to equation (3) improves spatial whitening further because it takes into account (and seeks to avoid) the directions used in the N previous signal bursts. It should be appreciated that the above spatial scanning methods seek by definition to fulfill equation (3).

In some embodiments, additional traffic conditions are taken into account during beam selection for downlink transmission. These traffic conditions may also be used to determine the nature of the directional hopping scheme employed. The interference density in a particular direction, the relative power loading conditions of the transmission branches, the allowed beam power and other traffic conditions, can all influence the direction which is selected for downlink transmission. One or more of such traffic conditions may be considered in combination with the directions used previously.

In implementations of such embodiments, each of the directions in the set of feasible directions $S_i$ may be assigned a priority which is taken into account during the beam selection process. For example, priority information relating to each of the feasible beam directions can be provided to the beam selection algorithm such that directions with higher priorities are selected in preference to those with lower priorities. Beam priority can be defined as a number which indicates a certain preference in the selection, e.g. when a directional hop is due, the base station may select the direction with the highest numerical priority.

In one embodiment only the directions within the set of feasible directions $S_i$ established based on direction of arrival information are assigned priority ratings. In another embodiment all of the available directions are assigned a priority rating based on the or each criteria deemed relevant in the particular application.

If interference density in a particular direction is to be taken into account during the beam selection process, then contributions to the priority of a given direction will increase as the number of co-channel users employing that direction decreases, and vice versa.

If the allowed beam power (average power or instantaneous power) is to be taken into account during the beam selection process, the contributions to the priority of a given direction will increase as the power employed in that direction tends away from the maximum allowed (average or instantaneous) power, and vice versa.

Other traffic conditions can influence the desirability of a direction for downlink transmission. Equipment and/or network limitations may mean that traffic conditions effect the desirability of certain directions, traffic conditions may increase the possibility of component failure. For example, each transmitting antenna element of a transceiver station is connected to circuitry which is typically sensitive to the electrical loading conditions resulting from transmission to multiple users. For example, in many transceiver station configurations each transmitting antenna is connected to a power amplifier. The distribution of power across these power amplifiers depends upon the traffic conditions (e.g. the number of connected mobile stations) and is a critical issue because the loading conditions dictate important characteristics which the power amplifier are required to possess. When selecting a power amplifier for a given application it is necessary to consider the mean power requirements and also the maximum amount of power (peak power) it will be required to withstand. Peak power loading results when a given transmission branch (including the antenna and associated power amplifier) is selected to serve a large number of users simultaneously. It is necessary to select power amplifiers designed with correspondingly high crest factors CF (CF=Peak Power/Average Power). The design constraints can be relaxed if the electrical load can be evenly distributed between the available power amplifiers, thereby avoiding problematic power imbalances or high peak loads in any particular branch.

Thus, the beam selection algorithm may seek to maintain an even power distribution over the various transmission branches in use, that is, the beam selection algorithm is provided with information on the power loading conditions of the transmission branches resulting from all of the mobile stations connected at the time. In such embodiments, the downlink transmission direction is, whenever possible, selected such that the new direction tends not to produce an unbalanced power loading condition between the available transmission branches. The beam selection algorithm may take into account peak and/or average power loading conditions. As an example, one such beam selection algorithm selects, whenever, possible a downlink transmission direction which is statistically unloaded. A given direction is more likely to be selected for downlink transmission if it is different to one or more directions used previously and the instantaneous (and/or average) power loading is lower than in other directions. In one such embodiment, the beam selection algorithm only regards a direction as feasible for downlink transmission if the power loading conditions indicate that the instantaneous (and/or average) power loading conditions are lower than in other directions. In another embodiment, the beam selection algorithm only regards a direction as feasible for downlink transmission if the instantaneous (and/or average) power loading conditions are below a predetermined or adaptively set threshold.

Such methods are effective because the interference generated by the transmitted signal is spatially whitened and because the method reduces the risk of hardware impairments or failure. Using the example of power amplifiers, high peak loads in a given power amplifier will be avoided and the average power requirements for each power amplifier will be substantially the same. Practical implementations which take power loading conditions into account can monitor the bit-rate (which is indicative of transmitted power) imbalance between the various transmission branches in use. Thus, the higher the bit-rate used in a given direction in relation to the bit rate used in another directions, the lower is the contribution to priority of that direction.

The methods described thus far increase diversity using a single transmission beam by controlling the selection of transmission direction in the spatial (angular) regime. Such methods become more effective as the angular spread of the radio environment and/or the resolution of the antenna array are increased. The methods described thus far make no attempts to increase diversity by increasing the number of beams transmitted.

Figure 7:
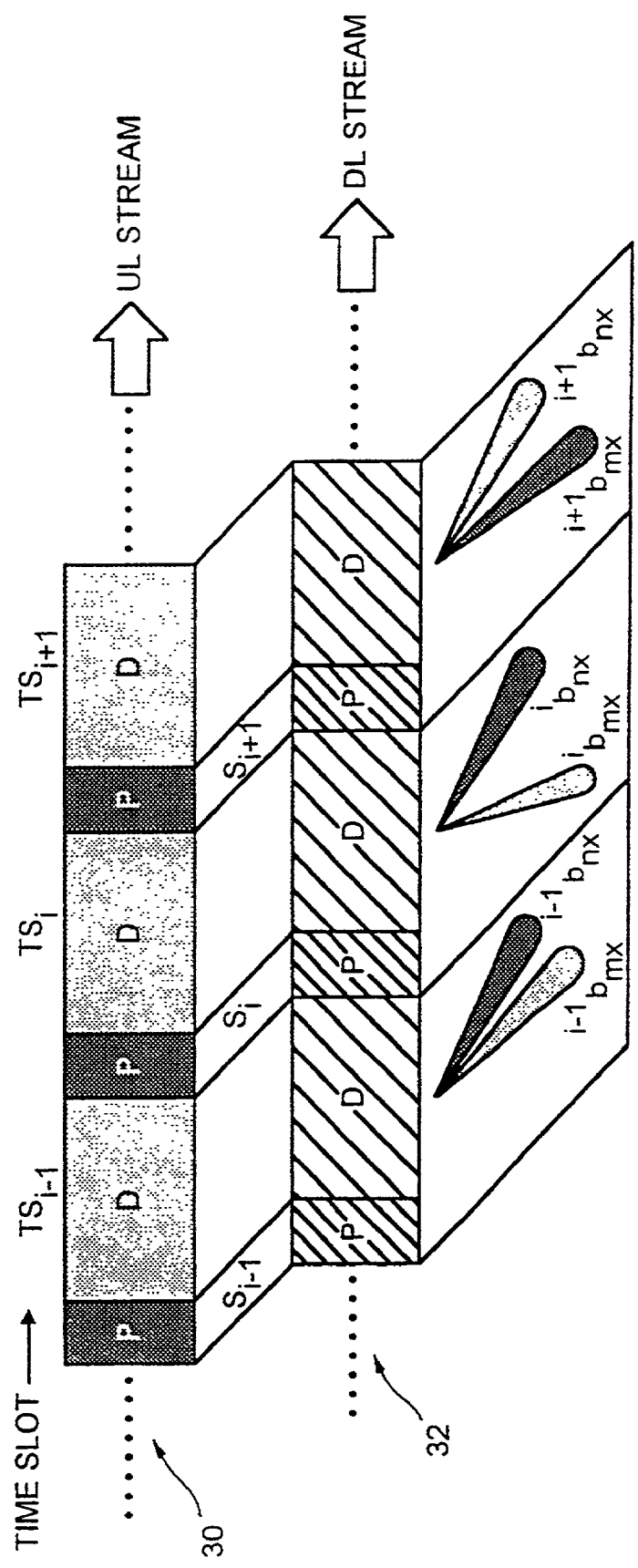
FIG. 7 is a representation of uplink and downlink communication bursts used in a second embodiment.

FIG. 7 illustrates an embodiment employing the selection of multiple transmission directions from the set of feasible directions (i.e. $1_i > 1 \forall_i$). In the example of FIG. 7, two downlink transmission directions are selected simultaneously. The selection of two transmission beams instead of one provides a greater diversity gain than, for example, changing from the selection of three beams instead of two. At the same time, using a maximum of two downlink transmission beams limits the total amount of generated interference.

Referring to FIG. 7, two beam directions are selected for downlink transmission in each time slot and, whenever possible, the directions selected are different to those used for transmission in the preceding time slots For the signal bursts received in the (i−1)th time slot, the set of feasible directions for transmission in the downlink direction is indicated as $S_{i-1}$. This set is determined from the angular power profile of the pilot symbols P received in the (i−1)th time slot as described hereinbefore. The beam selection algorithm 34 which is provided with information 36 on the transmission direction used in previous time slots then selects two beam directions to be used for the transmission in the corresponding downlink time slot. In the (i−1)th time slot, the directions selected for downlink transmission are $^{i-1}b_{mx}$ and $^{i-1}b_{nx}$. It will be apparent that the set $S_{i-1}$ of possible directions for downlink transmission in the (i−1)th time slot would have contained the directions $b_{mx}$ and $b_{nx}$ and it may or may not have contained other feasible transmission directions for the return communication.

For the signal burst received in the ith time slot the set of possible directions for transmission in the downlink direction is indicated as $S_i$. This set is determined from the angular power profile of the received pilot symbols of the ith receive time slot as above. The beam selection algorithm 34 selects two beam directions to use for transmission in the corresponding downlink time slot based on the contents of the set $S_i$ and on the knowledge of which two directions were used in the preceding (i−1)th downlink time slot. In this example, the directions $^ib_{mx}$ and $^ib_{nx}$ are selected for transmission in the corresponding ith downlink time slot. It should be appreciated that the set $S_i$ of feasible directions for downlink transmission in the ith time slot contained the directions $b_{mx}$ and $b_{nx}$ and may also have contained other feasible transmission directions for the downlink communication. The directions $b_{mx}$ and $b_{nx}$ were selected because they were feasible directions as determined in the angular power profile of the pilot symbols for the ith time slot and were different directions to those used in the preceding downlink transmission slot. However, had the set $S_i$ contained only the directions $^{i-1}b_{mx}$ and $^{i-1}b_{nx}$, then it would have been unavoidable but to select those directions and thus the same transmission directions would have been used in the successive (i−1)th and ith time slots.

For the burst received in the (i+1)th time slot the set of feasible directions for transmission in the downlink direction is indicated as $S_{i+1}$. This set is determined from the angular power profile in the usual manner and is input into the beam selection algorithm 34 which also knows which beam directions were used in the preceding ith time slot. In this example, the set $S_{i+1}$ of feasible directions for transmission in the downlink direction contains the directions $^{i+1}b_{nx}$ and $^{i+1}b_{mx}$ which were not used in the preceding ith time slot and which are selected for downlink transmission in the i+1th time slot.

The double beam embodiment described in relation to FIG. 7 can be expressed mathematically by defining the directions of transmission $^ib_{mx}$ and $^ib_{nx}$ ($^ib_{mx}$ does not equal $^ib_{nx}$) corresponding to the ith transmission slot as:

$$\{^ib_{mx}, ^ib_{nx}\} \in S_i \text{ and, whenever possible,} \qquad (4)$$
$$^ib_{mx} \neq \{^{i-1}b_{mx}, ^{i-1}b_{nx}\} \text{ and } ^ib_{nx} \neq \{^{i-1}b_{mx}, ^{i-1}b_{nx}\}$$

It should be appreciated that in certain circumstances one or both of the directions $^ib_{mx}$ and $^ib_{nx}$ selected for downlink transmission may not differ from beam directions selected for transmission in the preceding downlink slot. That is, selection of transmission directions which are different to those used in the preceding time slot will not be possible if the set of feasible transmission directions comprises a limited number of feasible directions, one or more of which corresponding to a direction used in the preceding slot. These exceptions can be expressed mathematically as follows $$S_i = \{^{i-1}b_{mx}, ^{i-1}b_{nx}\}$$

As with the embodiment of FIG. 6, selection of the downlink transmission direction can be governed by rules which seek on average to systematically and evenly illuminate the sector such that the probability of transmitting in a given direction $b_1$ to $b_8$ is constant (i.e. 1/M where M is the number of possible transmission directions available). In principle, strategies such as the random directional hopping strategies, the hopping strategies according to predetermined patterns, and directional hopping strategies according to stepped hopping patterns can be applied to the multi-beam transmission embodiment of FIG. 7. For example, a random directional hopping strategy with a verification procedure to minimise use of corresponding directions in successive signal bursts can be used in conjunction with a multiple beam selection embodiment. Random beam selection methods will attempt to randomly select the two (or n directions to be used). Verifications can be done to check if repeated selections occurred as in the single beam case.

Increasing spatial scanning, decreasing spatial scanning and increasing-decreasing spatial scanning strategies and stepped scanning strategies can all be applied, inter alia, to the embodiment of FIG. 7. Likewise, any additional criteria which influence the desirability of a direction for downlink transmission may be taken into account. For example, the allocation of priroity ratings to directions based on traffic conditions can be applied, inter alia, to the embodiment of FIG. 7.

It should be appreciated that the multi-beam embodiment of FIG. 7 exploits diversity by ensuring the generated interference is spread evenly over the cell or cell sector served by the base station. However, multi-beam embodiments also gain diversity by using more than one beam transmission direction simultaneously, thus exploiting higher order angular diversity. As with the embodiment of FIG. 6, the effectiveness of multi-beam embodiments increases as the angular spread of the environment and the resolution of the antenna array are increased.

The embodiment of FIG. 7 changes the nature of the generated interference so as to cause less disturbance to other co-channel users. The total amount of generated interference is limited by imposing a maximum number of two transmission beams in any one signal burst. The reduced disturbance of co-channel users is a considerable advantage, particularly in multi-rate systems.

FIG. 2 is only a schematic representation of the eight possible beam directions which can be achieved with the antenna array 6. In practice, however, there will in fact be an overlap between adjacent beams. In some embodiments of the present invention, the width of the beams can be varied as well as the number of beams which are provided to cover a given area. Future communication systems employing large numbers of antennas will facilitate truly multi-beam transmission ($1_i \gg 1$) using narrower beams. However, with narrow beams, the amount of generated interference is not spatially spread as effectively as with larger beam widths, and embodiments of the present invention will thus provide further advantages.

To maximise the effectiveness of multi-beam diversity gain the mobile station which receives the signal can be capable of resolving the signals corresponding to the different paths. A frequency-selective radio environment can inherently provide signal separation at the receiver. In a flat-fading environment (e.g., an indoor cell) the means for separating the signals must be provided by the transmitter itself because otherwise signals from different beams will arrive with similar delays. It follows therefore that in those cases, when transmitting with multiple beams ($1_i > 1$), artificial delays can be introduced in the corresponding transmitting branches such that the relative delays among the transmitted signals enable the receiver to separate the various signal components. In fact, any suitable signal separation technique can be employed. For example in other embodiments, the signals from different beams could be separated by using different pilot sequences or spreading codes in each respective beam direction.

Thus preferred embodiments provide a method by which a base station can spatially whiten the generated interference by virtue of using directional hopping in the downlink transmission direction. Both single or multi-beam hopping approaches can be used. Since the directions for downlink transmission are chosen from a set of feasible transmission directions determined from measuring parameters of the uplink communication stream, the downlink performance is better than that of conventional methods exploiting a single antenna element or beam. This method is therefore an efficient and reliable method for downlink transmission.

A plurality of different directional hopping strategies (for example random hopping, predetermined hopping, step hopping) are presented as examples of how selection of the downlink transmission direction can be controlled to ensure that the cell or cell sector served by the base station if systematically and uniformally illuminated. Whenever possible, the information for a given user can be transmitted on a different beam (or beams) in each time slot. In the long term, the interference will be spatially averaged. This is particularly beneficial in multi rate systems (e.g. in wide band code division multiple access WCDMA) systems where high bit rate users could even mask low bit rate users.

The directional hopping in the angular domain is (i) exploited by the target user, even with a single antenna receiving station, as diversity which is seen as a decrease of desired signal outage probability and (ii) seen by each co-channel user as the time hopping interference source which has less probability of causing problems than a constant interference source.

In modified versions of the method, the hopping patterns/selection rules could be defined as specific states. In such cases, state selection depends on channel characteristics and past behaviour.

In another modified version, the method is extended to the case of packet data transfer. A packet will be equivalent to a time slot. Note that two consecutive time slots are usually separated by a constant period of time while two successive packets may be separated by an indeterminate time period. In such modified versions, two consecutive packets will be transmitted, whenever possible, in different directions according to the selection characteristics of the particular embodiment.

In another modified version, the method is extended to the case of bitwise signal processing. According to this version, both the reference signal and data signal of a burst received in the uplink direction each comprise a succession of signal components referred to herein as bits. Likewise, communication bursts transmitted in the downlink communication stream each include a reference signal and a data signal comprising a succession of signal components referred to herein as bits. Respective signal components, namely the respective signal bits, of the reference signal and/or the data signal are transmitted, whenever possible, in substantially different directions as defined in relation to the embodiments described herein.

In another modified version, the directional hopping frequency may be reduced by, for example, hopping only after a predetermined number N of time slots (or signal bursts or signal components). Thus a different selection is made for successive groups of transmitted signals.

In the embodiments described herein, the directions of transmission for the downlink direction are selected based on the direction of arrival and the energy of the corresponding received signal in the uplink direction. However, any suitable criteria can be used to determine the beam directions for transmission. For example, other embodiments take into account the minimum delay and/or the minimisation of generated interference in specific directions.

In another modified version, the receiving station (e.g. mobile station) makes or contributes to the selection of direction for downlink transmission. The receiving station may also determine the nature of the directional hopping scheme employed. This represents a type of closed-loop system as opposed to the open-loop systems considered hitherto.

The performance of the various embodiments described herein leads to improvements in correlations between the directions of arrival estimated from the uplink communications and the selection of transmission directions for the downlink channels.

In another modified version, signal bursts in a given direction are assigned a unique code which is orthogonal to other codes being used in the signal transmission. Referring to the ith time slot shown in FIG. 7, a signal transmitted in the direction $^i b_{mx}$ can be assigned a first code and signal transmitted in the $^i b_{nx}$ direction can be assigned a second code, the first and second codes being orthogonal.

Embodiments of the invention can advantageously be used in micro and/or pico cell environments, e.g. in indoor environments. Such radio environments not only carry large angular spreads but are also characterised by small delay spreads due to the small size of the environments. This is greatly beneficial, particularly in schemes exploiting orthogonality (e.g. code orthogonality). It is also in these environments where high bit rate users can be expected.

Signals which are transmitted in the selected downlink direction may be multiplexed with respect to time, frequency, space or spreading code. The different methods described hereinbefore can be used separately or in any combinations. Whilst embodiments of the present invention have been described in the context of a CDMA system, the present invention can be used with any other type of access system.

Methods illustrated with the downlink signal direction can be applied equally to the uplink signal direction provided the mobile station has means to implement the method. Embodiments of the present invention can be implemented in a mobile station as well as a base station.

The implementation should not be limited to the configurations of described embodiments. Specifically, the described embodiments show examples of configurations which may be used to implement the method and are not intended to define the only type, configuration or order of the apparatus features which should be used.

The invention claimed is:

1. A method of directional radio communication between a first station and a second station, the method comprising the steps of:
    determining at the first station a plurality of beam directions which are feasible for use in transmitting a signal from said first station to said second station using a signal received from said second station;
    selecting at said first station, from the plurality of beam directions, a direction for transmission of a signal from said first station to said second station, wherein the selection of the direction for transmission is such that successive signals or groups of signals are transmitted in substantially different directions and such that on average each of said plurality of beam directions is used a substantially equal number of times.

2. A method as in claim 1, wherein the direction for transmission is selected randomly from said plurality of beam directions in a first random selection step.

3. A method as in claim 2, wherein a second selection is made from the plurality of beam directions if the first selection step selects a direction used in at least one preceding signal transmission.

4. A method as in claim 3, wherein a further random selection is made from the plurality of beam directions if the second random selection also indicates a direction used in at least one preceding signal transmission.

5. A method as in claim 3, wherein the direction for transmission is used whether or not it is the same as a direction used in the at least one preceding signal transmission.

6. A method as in claim 1, wherein the direction for transmission is selected from the plurality of beam directions according to predetermined rules.

7. A method according to claim 6, wherein the direction for transmission is selected by selecting the next feasible direction to that used in the preceding transmission.

8. A method as in claim 7, wherein the selection process for successive transmissions steps through the plurality of beam directions in a first direction.

9. A method as in claim 8, wherein the selection process for successive transmissions steps through the plurality of beam directions in a second direction opposite to the first direction when a predetermined boundary is reached.

10. A method as in claim 6, wherein signals are transmitted such that the directions selected alternate respectively from one side of the preceding direction to the other side, at least a predefined angular spacing from said first direction being maintained in each instance.

11. A method as in claim 6, wherein a reference direction is defined and subsequent signals are transmitted such that the directions selected alternate respectively from one side of the reference direction to the other side, at least a predefined angular spacing from said reference direction being maintained in each instance.

12. A method as in claim 1, wherein the direction for transmission is selected for a given signal burst in a code division multiple access system.

13. A method as in claim 1, wherein the direction for transmission is selected for a given time slot in a time division multiple access system.

14. A method as in claim 1, wherein the direction for transmission is varied within a signal burst such that the direction for transmission is selected for a component part of a signal packet or a time slot.

15. A method as in claim 1, wherein one of said plurality of beam directions is selected for the transmission of a signal from said first station to said second station.

16. A method as in claim 1, wherein more than one of said plurality of beam directions is selected for the transmission of a signal from the first station to the second station.

17. A method according to claim 16, wherein two beam directions are selected for the transmission of a signal from said first station to said second station.

18. A method according to claim 1, wherein at least one of said plurality of beam directions is selected for successive groups of signals and each group of signals comprises a predetermined number of time slots.

19. A method according to claim 1, wherein at least one of said plurality of beam directions is selected for successive groups of signals and each group of signals comprises a predetermined number of signal packets.

20. A method according to claim 1, wherein at least one of said plurality of directions is selected for successive groups of signals and each group of signals comprises a predetermined number of component parts of a signal packet or a time slot.

21. A method according to claim 1, when used in a network comprising a plurality of network elements comprising at least a plurality of said first and second stations, said selection step additionally taking into account at least one network criteria and/or at least one network element criteria.

22. A method as in claim 21, wherein the selection step takes into account interference density in one or more directions.

23. A method according to claim 21, wherein the selection step takes into account power loading conditions of components within said first station.

24. A method as in claim 23, wherein the selection step takes into account instantaneous power loading conditions of components within the first station.

25. A method as in claim 23, wherein the selection step takes into account average power loading conditions of components within the first station.

26. A method as in claim 23, wherein the selection step takes into account the bit-rates of multiple users connected to said first station.

27. A method according to claim 1, wherein the selection step takes into account traffic conditions for the plurality of beam directions.

28. A method according to claim 1, wherein the selection step takes into account statistical loading of the plurality of beam directions.

29. A method according to claim 1, wherein the selection step comprises allocating one or more of said plurality of beam directions a priority rating based on additional criteria taken into account, said selection step favouring directions with highest priority.

30. A method as in claim 29, wherein directions which have a low statistical use are allocated a greater priority than directions which have a relatively high statistical use.

31. A method as in claim 1, wherein said second station at least influences the selection made by the first station.

32. A method as in claim 1, wherein said first station is a base station.

33. A method as in claim 1, wherein said second station is a mobile station.

34. Apparatus for directional radio communication between a first station and a second station, the apparatus comprising:

a circuit that determines a plurality of beam directions which are feasible for use in transmitting a signal from said first station to said second station using a signal received from said second station; and a circuit that selects at said first station, from the plurality of beam directions, a direction for transmission of a signal from said first station to said second station, wherein the selection of the direction for transmission is controlled such that successive signals or groups of signals are transmitted in substantially different directions and such that on average each of said plurality of directions is used a substantially equal number of times.

* * * * *